Oct. 3, 1933.        A. KUTSCHA              1,928,859
                 CONVERTIBLE TRUCK BODY
        Original Filed March 13, 1929    3 Sheets-Sheet 1
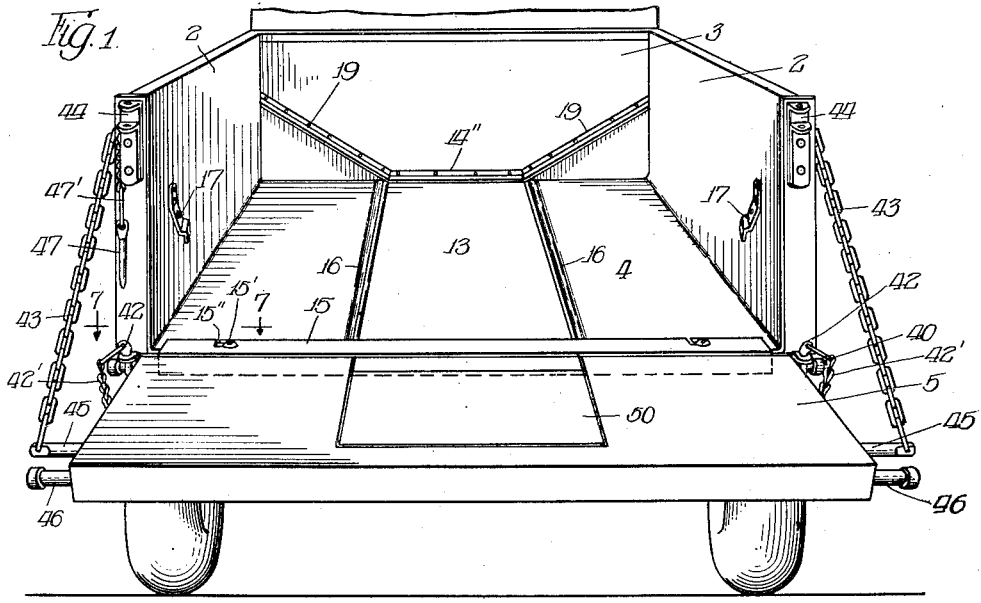
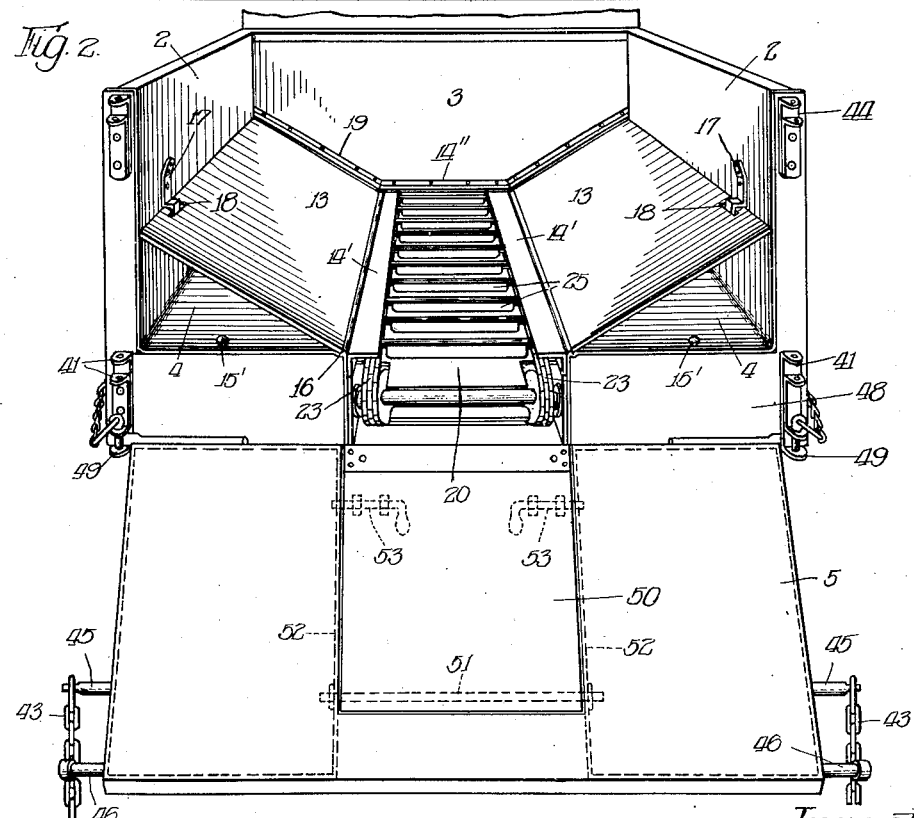

Oct. 3, 1933.    A. KUTSCHA    1,928,859
CONVERTIBLE TRUCK BODY
Original Filed March 13, 1929    3 Sheets-Sheet 2
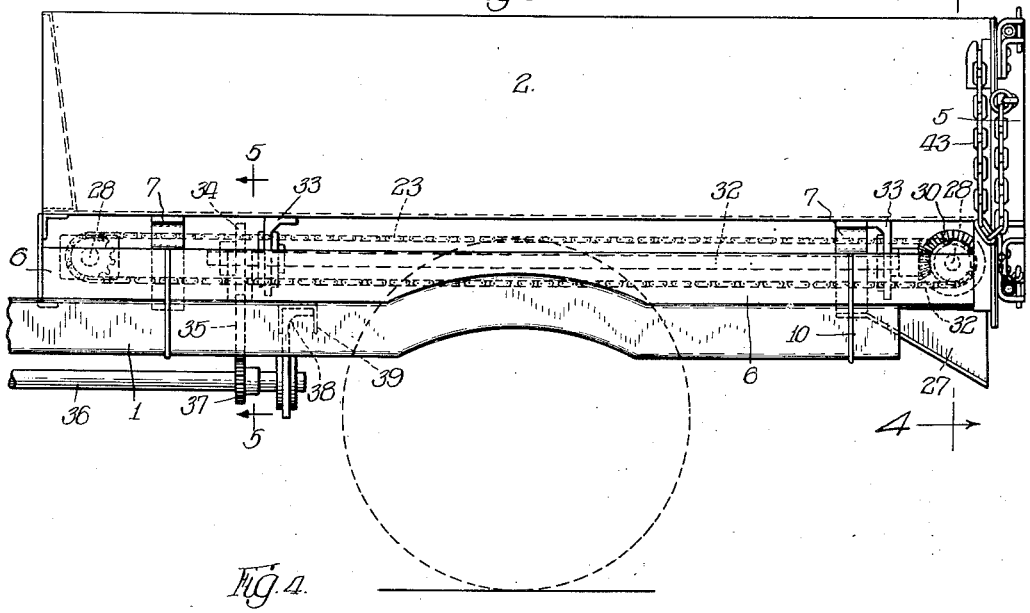
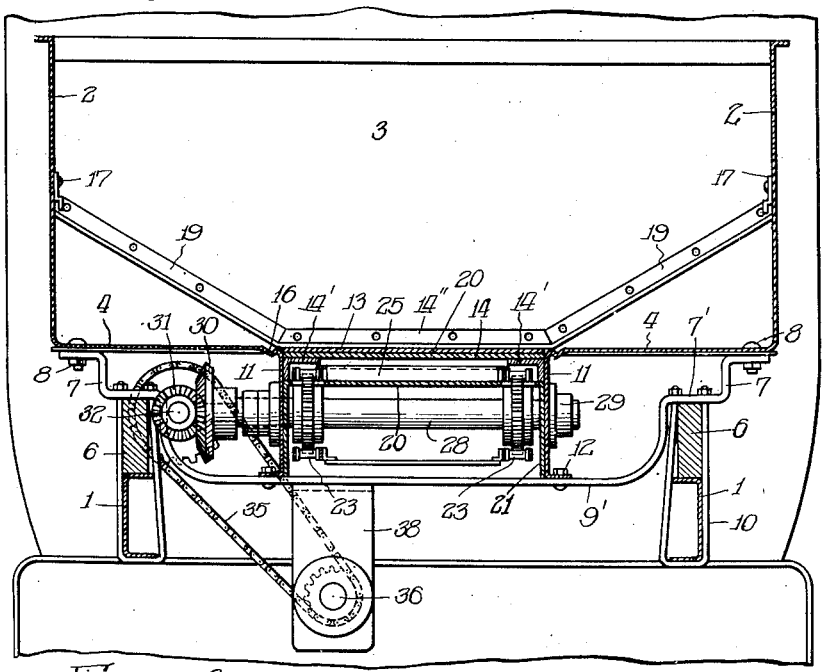
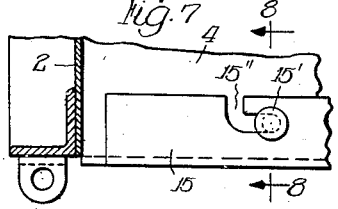
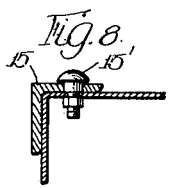
Inventor:
Alois Kutscha
By Wm. O. Belt
Atty.

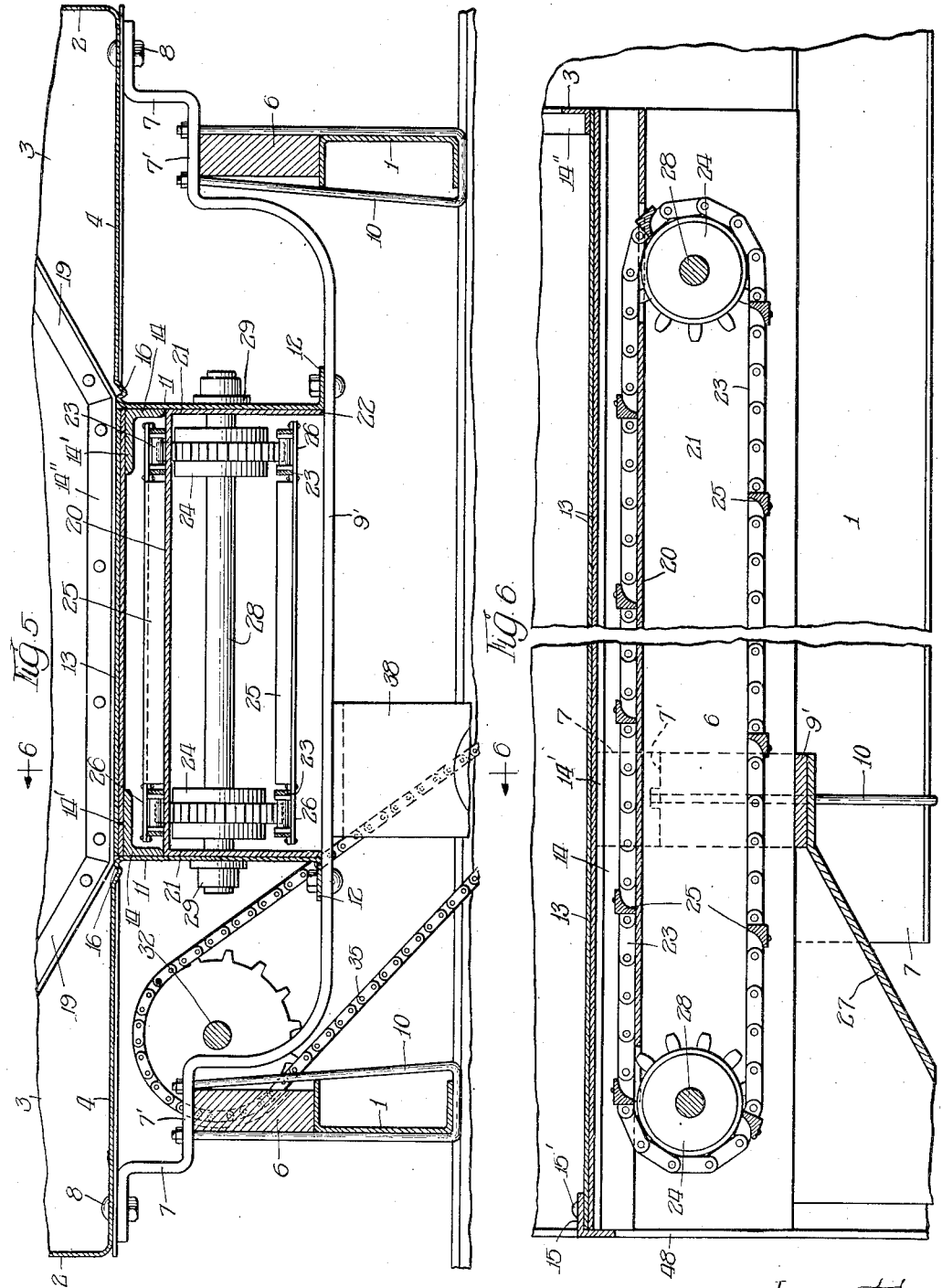
Oct. 3, 1933.    A. KUTSCHA    1,928,859
CONVERTIBLE TRUCK BODY
Original Filed March 13, 1929    3 Sheets-Sheet 3

Patented Oct. 3, 1933

1,928,859

UNITED STATES PATENT OFFICE 1,928,859

CONVERTIBLE TRUCK BODY

Alois Kutscha, Chicago, Ill.

Application March 13, 1929, Serial No. 346,518
Renewed February 18, 1933

2 Claims. (Cl. 214—83)

My invention relates to improvements in automobile trucks and particularly in the bodies thereof, and the principal object of my invention is to provide a truck body which can be readily and quickly converted to different types best adapted for handling loads of different character to be hauled.

Another object of my invention is to provide a convertible truck body which will be simple, durable and reliable in construction, and effective and efficient in operation.

Other objects of my invention will appear hereinafter.

Referring to the accompanying drawings:

Fig. 1 is a view in perspective looking into the body as it is arranged for handling package goods and the like;

Fig. 2 is a similar view showing the tail gate swung down and the body converted to carry and dump bulk material;

Fig. 3 is a view in side elevation of the structure shown in Fig. 1;

Fig. 4 is a transverse vertical section on the line 4—4 of Fig. 3;

Fig. 5 is an enlarged transverse vertical section on the line 5—5 of Fig. 3;

Fig. 6 is a longitudinal section on the line 6—6 of Fig. 5;

Fig. 7 is a detail section on line 7—7 of Fig. 1; and

Fig. 8 is a detail section on line 8—8 of Fig. 7;

The drawings show a convertible body structure embodying my invention. This body structure is so arranged that it may be mounted on any suitable automobile chassis for the purpose. In Figs. 3 and 4 the side members 1 of the frame of an automobile chassis are shown, and the rear wheels thereof are indicated in dotted lines. The chassis frame members 1 are of standard channel construction. The body structure shown in Fig. 1 is of the express type, open at its top, and comprising two side wall members 2, a front end wall 3, a floor 4 and tail board or gate 5, all of which are preferably made of sheet metal. The body has two sill members 6 extending longitudinally underneath the body and spaced apart the same width as the chassis frame members 1, whereby the sills can be mounted upon the top edge of said frame members. The body is not mounted directly upon the sills but is spaced above the sills to provide additional room beneath the body for a conveyor, as hereinafter described. In order to support the body above the sills I provide the cross bars 7, two of which are used in the present structure. One of the crossbars is disposed near the rear end of the body and the other near the forward end of the body. These supporting crossbars 7 Figs. 3 and 5 are secured by bolts 8 at their outer ends to the floor of the body. They are bent downwardly for a portion of their length and then horizontally to provide seats 7' resting upon the sills 6. The central portion 9' of the crossbars is substantially horizontal between the sills and is positioned substantially in line with the lower edges of said sills, to form supports for the conveyor mechanism hereinafter described. The horizontal seat portions 7' of the crossbars are fastened in place on the sills, and the sills fastened to the chassis frame members 1 by means of the U-bolts 10 Fig. 5.

The side walls 2 of the body are preferably integral with the floor members or parts 4 by making the structure of sheet metal and bending it accordingly. The floor members 4 have portions 11 which are turned or bent downwardly into vertical position to form the walls 11 of a longitudinal trough or channel centrally disposed in the floor of the body, and the extreme lower edges of these vertical walls 11 are bent outwardly to form flanges 12 which rest upon and are securely bolted to the crossbars 9'. This forms a very rigid body structure. The walls 11, being vertically disposed, serve to rigidly support the central portion of the body floor.

The central trough or channel in which the conveyor operates is covered by removable sheet metal floor panels 13 which complete the continuity of the floor. These panels are laid one above the other as shown clearly in Fig. 5 and are supported by the angle bars 14 which extend longitudinally of the channel and which are bolted to the upright walls 11. The horizontal flanges 14' of these angle bars are positioned a distance below the plane of the floor just sufficient to support the upper one of the two floor panels 13 flush with the floor 4 so that the floor of the body is comparatively level and continuous throughout its whole width and length. The forward ends of the floor panels engage under the flange of an angle bar 14'' mounted on the end wall 3 across the end of the conveyor trough to hold the floor panels in place. The rear ends of the panels are held in position by a removable angle iron bar 15, Figs. 1, 2, 7 and 8, which is positioned at the rear edge of the body floor across the conveyor trough. This bar is substantially equal in length to the width of the body and locks the rear ends of the floor panels in place and at the same time provides a finished edge for the rear end of the body floor. This angle bar is removably attached to the body floor by the studs 15' which engage bayonet slots 15" in the bar. The body in the form just described is best adapted for carrying package goods, filled bags and such articles as are usually handled individually and stacked in the body.

An express body of the type, however, having a horizontal floor is not well adapted to carry loads of bulk material and it is my purpose to provide a structure which is quickly and easily convertible into a hopper body of a type which is best adapted to the handling of bulk loads. For this reason the floor panels 13 are made removable. The floor panels 13 are intended to be placed above the floor 4 between the side walls and the edges of the conveyor trough. They are inclined upwardly from this channel toward the side walls 2 so as to form a hopper bottom for the body and cause the bulk material to feed into the conveyor channel as the load is being discharged. The floor members 4 are provided with longitudinal grooves 16 adjacent the edges of the conveyor trough and these grooves form seats for the lower side edges of the floor panels 13 Figs. 4 and 5. The upper edges of the floor panels 13 rest against the side walls 2. Pivoted latches or lock members 17 are mounted on the side walls to engage slots or openings 18 in the floor panels 13 Figs. 1 and 2 and thus lock the floor panels in position. The front wall 3 of the body has inclined angle bars 19 extending from the edges of the conveyor channel to the side walls Figs. 1 and 2 and forming instanding flanges for holding the forward ends of floor panels 13 in place. The placing of the floor panels 13 is quickly and easily accomplished by simply laying the panels against the side walls 2 with their edges in the grooves 16, sliding the panels edgewise under the forward ends thereof to engage under the flanges 19 and then rotating the latches 17 into engagement with the openings 18.

The bottom of the conveyor trough is formed by a bottom or floor member 20 which extends the entire length of the trough and prevents the material from dropping through. This bottom member is preferably made of sheet metal and its edge portions 21 are turned downwardly into vertical position with the extreme edges 22 resting on the cross bars 9' to support the bottom wall 20 in position. The vertical members 21 are positioned against the inside walls of the members 11. The bottom wall 20 is positioned just enough below the plane of the floor 4 to provide room for the upper reach of the conveyor. The conveyor extends substantially the entire length of the body and consists generally of a pair of chains 23 Fig. 6 traveling around sprocket wheels 24 at each end of the conveyor. The sprocket wheels are so positioned that the upper reaches of the chains travel along and are supported by the upper surface by the bottom member 20 of the trough. The chains are spaced apart substantially the width of the trough so that their upper reaches lie just underneath the horizontal flanges 14' of the longitudinal angle bars 14 whereby the flanges 14' serve as guards to keep the material out of the chains and sprockets. The conveyor is provided with crossbars or flights 25 extending transversely and disposed at intervals around the chains. These flights have ears or extensions 26 by which they are fastened to the outside of the conveyor chains and they extend inwardly so that those on the upper reach of the conveyor sweep the conveyor trough and scrape the material from said bottom wall 20 as it is fed into the conveyor trough by the weight of the material in the load. The upper reach of the conveyor travels toward the rear end of the body and dumps or discharges the material from its rear end. An inclined delivery chute 27 Figs. 3 and 6 is hung from the bottom of the body just below the discharge end of the conveyor in position to guide the material. The conveyor sprocket wheels 24 are mounted on transverse shafts 28 which are supported in bearings 29 in the vertical members 11. The rear conveyor shaft 28 has at one end a beveled gear 30 which meshes with a similar beveled gear 31 on the end of a drive shaft 32. The shaft 32 is positioned just inside one of the sills 6 and beneath the body, and is supported in suitable hangers 33 secured to the under side of the floor of the body. A shaft extends forwardly to a point adjacent the forward end of the body and carries a sprocket wheel 34 which is driven by a chain 35 from a power shaft 36. The power shaft 36 has a corresponding sprocket wheel 37 to drive the chain. It is supported in the hanger 38 depending from one of the crossbars 39 of the chassis frame and is extended forward for connection with the motor or any other suitable source of power for driving the conveyor. This shaft 36 is preferably connected to the power take-off (not shown) which is usually provided in the transmission of automobile truck power plants.

When the body has been converted in the manner just described it is better adapted to handling loads of bulk material. Material loaded into the body is of course prevented from dropping through the floor by the bottom member 20 of the conveyor trough. When it is desired to unload the truck, the conveyor is started in operation to discharge the material from the under side of the load, and as the diminishing load settles down the inclined floor panels forming the hopper bottom the last remaining portions of the load will slide into the conveyor trough and carried by the conveyor to the rear and discharged.

I provide a suitable tail gate 5 at the rear end of the body. This tail gate has pins or studs 40 projecting from its ends adjacent the lower edge of the gate. Ears 41 are mounted at the rear end of the body for the studs 40 to form hinges about which the tail gate may be swung. The studs are locked in place by the pins 42 which are carried on short chains 42' to prevent their being lost. The tail gate may thereby be positioned at any angle with respect to the floor and chains 43 are provided for holding the tail gate in its adjusted position, the chains being anchored to the body side walls and to studs 45 outstanding from the ends of the gate. In Fig. 1 the tail gate is shown in horizontal position in the plane of the floor of the body thus serving as an extension or continuation of the floor. The rear end of the body has an apron 48 extending downwardly below the plane of the floor so that a tail gate wider than the depth of the body may be used. This apron also constitutes a rigid cross brace for the rear end of the body. The apron has a set of hinge lugs 49 at its lower corners into which the studs 40 of the tail gate may be interchangeably inserted. This apron extends below the floor to bring the upper edge of the tail gate level with the top edges of the side walls, but the gate may also be swung downwardly to the position shown in Fig. 2 to form a chute if desired. The upper ends of the body have open lugs 44 similar to the lugs or ears 41 which are adapted to be engaged by the studs 45 or 46 to hold the gate in closed position, and pins 47 on the chains 47' may be used to hold the studs in the lugs 41. The studs on the gate and the lugs on the rear end of the body are of the same construction so as to form interchangeable hinge connections for the gate and thus permit the gate to be used in any desired way best adapted to the particular purpose.

The tail gate Figs. 1 and 2 also has a central door 50 coinciding with the conveyor to provide an opening through which the material may also discharge when the tail gate is in this position closing the end of the body. This door may be hinged by the rod 51 which extends through holes in the vertical flanges 52 on the tail gate adjacent the door opening. The lower end of the door has two draw bolts 53 mounted adjacent its edges and these engage in holes in the flanges 52 to provide locks to hold the door in its closed position.

It will be obvious to those skilled in the art that my invention may be embodied in other structures without departing from the spirit and scope of the invention and I desire it to be so understood.

What is claimed is:

1. A truck body including side walls, floor members having vertically extending portions thereon arranged in spaced relation substantially midway between said side walls, a plate extending between said vertically extending members and providing a bottom for a trough defined thereby in cooperation with said vertically extending members, a front wall, a tail gate, detachable means for securing said tail gate to said body in adjusted positions whereby said tail gate may be arranged in the plane of said floor members or in position to provide a chute, means for retaining said tail gate in position to close the end of said body, and a conveyor in said trough for moving material from said body toward said tail gate to permit discharge of said material when said tail gate is moved from closing position relative to the end of said body and is attached to said body to provide a chute.

2. A truck body including side walls, floor members having vertically extending portions thereon arranged in spaced relation substantially midway between said side walls, a plate extending between said vertically extending members and providing a bottom for a trough defined thereby in cooperation with said vertically extending members, a conveyor in said trough, removable plates disposed over said trough to close the same and cooperating with said floor members to provide a continuous floor for said body, and a removably mounted angle strip at one end of said body for clamping said plates in closing position over said trough.

ALOIS KUTSCHA.